United States Patent
Takatori et al.

(10) Patent No.: US 7,570,685 B2
(45) Date of Patent: Aug. 4, 2009

(54) SYSTEM, METHOD AND APPARATUS FOR CROSSTALK CANCELLATION

(76) Inventors: Hiroshi Takatori, 932 S. Beach Dr., Sacramento, CA (US) 95831; Kenneth C. Dyer, 3040 Prado La., Davis, CA (US) 95616; Mark Callicotte, 7628 Windbridge Dr. #70, Sacramento, CA (US) 95831

( * ) Notice: Subject to any disclaimer, the term of this patent is extended or adjusted under 35 U.S.C. 154(b) by 902 days.

(21) Appl. No.: 10/959,622

(22) Filed: Oct. 5, 2004

(65) Prior Publication Data
US 2005/0074055 A1 Apr. 7, 2005

Related U.S. Application Data

(60) Provisional application No. 60/509,434, filed on Oct. 6, 2003.

(51) Int. Cl.
H04B 1/38 (2006.01)
(52) U.S. Cl. .................. 375/219; 375/222; 370/201; 370/286; 455/63.1
(58) Field of Classification Search .......... 375/219, 375/222, 346; 370/268, 286, 201; 379/406.01, 379/406.06, 406.08; 455/63.1
See application file for complete search history.

(56) References Cited

U.S. PATENT DOCUMENTS

| | | | | |
|---|---|---|---|---|
| 5,181,198 | A | | 1/1993 | Lechleider ............... 370/286 |
| 5,483,551 | A | * | 1/1996 | Huang et al. ............. 375/219 |
| 6,201,796 | B1 | | 3/2001 | Agazzi ..................... 370/286 |
| 6,212,225 | B1 | | 4/2001 | Agazzi ..................... 375/220 |
| 6,236,645 | B1 | | 5/2001 | Agazzi ..................... 370/286 |
| 6,272,173 | B1 | | 8/2001 | Hatamian ................. 375/229 |
| 6,304,598 | B1 | | 10/2001 | Agazzi ..................... 375/232 |
| 6,463,041 | B1 | | 10/2002 | Agazzi ..................... 370/286 |
| 6,792,038 | B2 | | 9/2004 | Agazzi ..................... 375/220 |
| 6,934,387 | B1 | * | 8/2005 | Kim ......................... 379/406.08 |
| 2001/0004383 | A1 | * | 6/2001 | Nordstrom et al. ....... 375/222 |
| 2001/0019581 | A1 | | 9/2001 | Agazzi ..................... 375/220 |
| 2001/0036160 | A1 | * | 11/2001 | Curran et al. ............. 370/290 |

(Continued)

FOREIGN PATENT DOCUMENTS

WO   WO 03/084117   * 10/2003

OTHER PUBLICATIONS

J.W. Cook et al. "The Noise and Crosstalk Environment for ADSL and VDSL Systems," *IEEE Communications*, May 1999, pp. 73-78.

(Continued)

*Primary Examiner*—Temesghen Ghebretinsae (57) ABSTRACT

The present invention effectively cancels echo, near-end crosstalk and far-end crosstalk. A FEXT canceller is placed at the transmitter rather than at the receiver according to an aspect of the invention. In some embodiment, a FEXT canceller can be placed at the receiver only or the combination of both ends. The FEXT canceller is continuously adapted with information sent back from a remote receiver and with data from a neighbor transmitter that causes the crosstalk at the remote receiver. This allows the FEXT canceller to quickly adapt to a change in crosstalk function or conditions with the surrounding environment, for example, aging, temperature, humidity, physical pressure, etc. In some embodiments, an adaptation control signal is sent back from the receiver to the transmitter by using an overhead bit in the frame format. In some embodiments, part of the FEXT canceller is built-in at the remote receiver.

18 Claims, 8 Drawing Sheets

U.S. PATENT DOCUMENTS

| | | | |
|---|---|---|---|
| 2001/0055335 A1 | 12/2001 | Agazzi et al. | 375/232 |
| 2002/0141495 A1* | 10/2002 | Hatamian | 375/229 |
| 2002/0196747 A1 | 12/2002 | Agazzi | 370/286 |
| 2003/0053531 A1 | 3/2003 | Agazzi | 375/220 |
| 2004/0090927 A1 | 5/2004 | Zimmerman et al. | 370/268 |
| 2004/0170230 A1 | 9/2004 | Zimmerman et al. | 375/285 |
| 2004/0184518 A1 | 9/2004 | Agazzi | 375/220 |

OTHER PUBLICATIONS

Aaron Egier, "Overcoming Crosstalk in DSL Systems," Draft dated Nov. 19, 2002 [Retrieved from the Internet on Sep. 23, 2004 <<URL: http://www.eecg.toronto.edu/~tcc/ece1392/egier.pdf>>] pp. 1-9.

Mike Bichan, "Echo Cancellation in Crosstalk-Limited Chip-to-Chip Communication," Slides dated Nov. 2003 [Retrieved from the Internet on Sep. 23, 2004 <<URL: http://www.eecg.toronto.edu/~mbichan/bichan_ece1392.pdf>>] pp. 1-15.

Roberto A. Uzcategui "Crosstalk Mitigation in DSL Systems" Research Interests [Retrieved from the Internet on Sep. 24, 2004 <<URL: http: //users.ece.gatech.edu/~roberto/research/>>] pp. 1-2.

G. Ginis and J. M. Cio, "Vectored-DMT: A FEXT canceling modulation scheme for coordinating users," ICC 2001, Helsinki, Finland, accepted for presentation. [Retrieved from the Internet on Sep. 24, 2004 <<URL: http: //citeseer.ist.psu.edu/ginis01vectoreddmt.html>>], pp. 1-5.

* cited by examiner

SYSTEM, METHOD AND APPARATUS FOR CROSSTALK CANCELLATION

CROSS-REFERENCES TO RELATED APPLICATIONS

This application claims priority from the provisional Patent Application No. 60/509,434, filed Oct. 6, 2003, the entire content of which is incorporated herein by reference.

BACKGROUND OF THE INVENTION

1. Field of the Invention

This invention relates generally to crosstalk interferences and transmission quality affected thereby. More particularly, it relates to a system, method, and apparatus that achieves crosstalk cancellation at the transmitter end, at the receiver end, or at both ends with information obtained at the receiver end.

2. Description of the Related Art

Crosstalk generally refers to unwanted noises, sounds or other signals picked up by one channel of an electronic communication system from another channel, for example, between telephone lines in the same or neighboring bundles. Unlike Gaussian and power supply noises, crosstalk cannot be overpowered with large signal swings. On the contrary, crosstalk scales with signal swing, i.e., a larger bandwidth is usually accompanied with more severe crosstalk interferences. Today, degradation of transmission quality by the crosstalk noises remains a significant problem at the network level, for example, Ethernet, DSL, etc., as well as at the device level such as disk drive read-write devices, etc.

Crosstalk is commonly classified into near-end crosstalk (NEXT) and far-end crosstalk (FEXT). FEXT is similar in nature to NEXT. However, FEXT and NEXT affect the transmission quality differently. NEXT affects any systems which transmit in both directions at the same time, for instance, echo-canceling systems. FEXT appears at the far-end, or opposite end, of its source via a communication link such as a cable. NEXT is larger (i.e., dominant) than FEXT because the interference source is closer to the receiver. This is true when the channel of signal path has great attenuation. When the channel is short, however, both NEXT and FEXT have the same degree of effect on the transmission quality.

Many existing systems focus on reducing or mitigating NEXT. For example, some DSL systems use frequency- or time-division duplexing to avoid transmitting in both directions in the same band at the same time. Moreover, because the interference source is closer to the receiver, most of the known techniques perform crosstalk cancellation at the receiver end.

On the other hand, very few viable solutions available today that can effectively cancel FEXT. One of the obstacles is that FEXT tests are affected by signal attenuation to a much greater degree than NEXT, since FEXT is measured at the far end of the communication link where signal attenuation is the greatest. Moreover, measuring FEXT itself is a daunting task. As discussed by J. W. Cook et al. in "The Noise and Crosstalk Environment for ADSL and VDSL Systems," *IEEE Communications*, May 1999, pp. 73-78, measuring FEXT is very time-consuming and involved, even in a laboratory environment.

Clearly, there is a need in the art for a viable crosstalk cancellation system that is capable of overcoming crosstalk interferences not only at the near-end but also at the far-end. The present invention addresses this need.

BRIEF SUMMARY OF THE INVENTION

An important goal of the present invention is to effectively cancel crosstalk interferences at both the near-end as well as the far-end. This goal is achieved, in some embodiments, by placing an FEXT canceller at the transmitter rather than at the receiver and performing FEXT cancellation with information obtained at the receiver end. Alternatively, the FEXT canceller can be placed at the receiver only. In some embodiments, the solution can be the combination of the two, e.g., placing a FEXT canceller at both the transmitter and the receiver, having part of the FEXT canceller built-in at the receiver, etc. According to the invention, a NEXT canceller is placed at the receiver to cancel not only NEXT but also echo noises.

According to an aspect of the invention, both FEXT and NEXT cancellers are implemented with digital signal processing capabilities for finite impulse response (FIR) filter calculation and for converting the digital output from the FIR filter to an analog signal. Both FEXT and NEXT cancellers are also implemented with analog circuits.

In some embodiments, the FEXT canceller is implemented digitally and added to the transmit symbol in the digital format and then converted to the analog signal. In some embodiments, the FEXT canceller is implemented together with any transmit filter operation. In some embodiments, the FEXT canceller is implemented at the receiver only and FIR filters in the receiver are adapted so that the signal to noise ratio (SNR) of all channels become maximum.

In some embodiments, an adaptation control signal is sent back from the receiver to the transmitter by using an overhead bit in the frame format. According to the present invention, adaptation is done continuously to compensate changes in crosstalk transfer-function or conditions with the surrounding dynamic environmental changes, such as aging, temperature, humidity, physical pressure, and aging effect of the channel.

The present invention can be implemented to cancel crosstalk, both NEXT and FEXT, in various systems, networks, and devices, for instance, computer networks such as the Ethernet, communication systems implementing the digital subscriber line (DSL) transmission technologies, cable modems, disk drive read-write devices, and wireless systems utilizing multiband orthogonal frequency-division multiplexing (OFDM) for ultrawideband (UWB) communications with quadrature amplitude modulation (QAM) constellation.

Other objects and advantages of the present invention will become apparent to one skilled in the art upon reading and understanding the preferred embodiments described below with reference to the following drawings.

DETAILED DESCRIPTION OF THE INVENTION

In the following detailed description, like reference numbers are used to refer to identical, corresponding or similar features and elements in various exemplary embodiments shown in the drawings.

Figure 1:
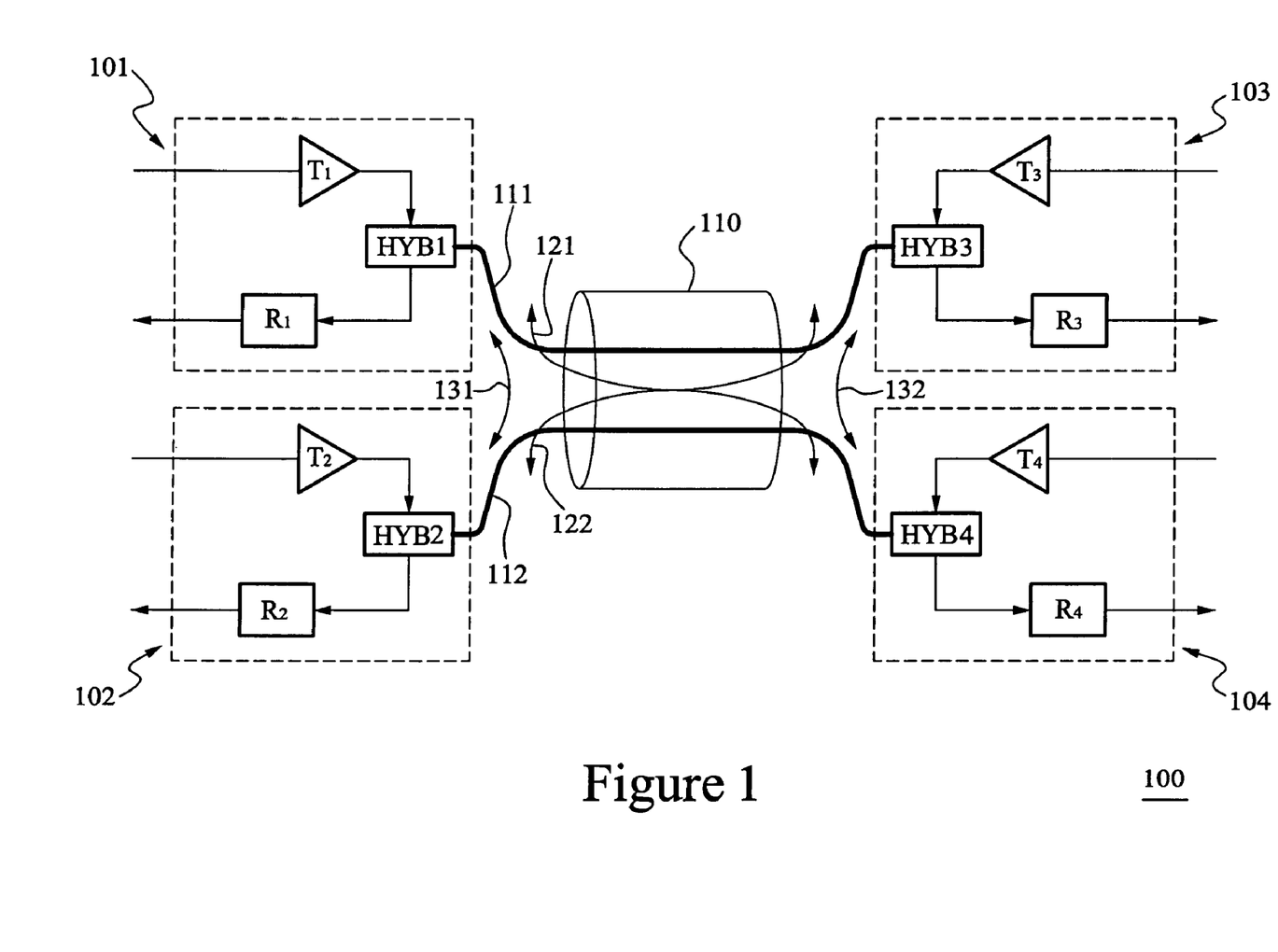
FIG. 1 shows an exemplary full duplex communication system where the present invention may be implemented.

FIG. 1 shows an exemplary full duplex communication system 100 where the present invention may be implemented. Note that, although a full duplex model is shown, the present invention applies to simplex as well. The system 100 comprises a communication channel 110 and four transceivers 101-104 respectively positioned at either end of the channel 110. Each of the transceivers 101-104 is typically configured with a transmitter T, a receiver R, and a hybrid HYB. These components are known to those skilled in the art and thus are not further described herein for the sake of brevity.

The communication link or channel 110 has two communication paths 111 and 112. In this example, the transceiver 101 communicates with the transceiver 103 via the communication path 111 and the transceiver 102 communicates with the transceiver 104 via the communication path 112. The transceivers 101 and 102 are localized so that data transfer therebetween can be done reliably. Similarly, the transceivers 103 and 104 are localized for reliable data transfer therebetween.

As illustrated in FIG. 1, crosstalk commonly occurs in the communication channel 110 both at the near-end (NEXT) 131-132 and at the far-end (FEXT) 121-122. Left unsolved, crosstalk noises would cause severe degradation of the transmission quality. The present invention provides several embodiments that cancel or avoid crosstalk interferences, thereby significantly improving transmission quality.

Figure 2:
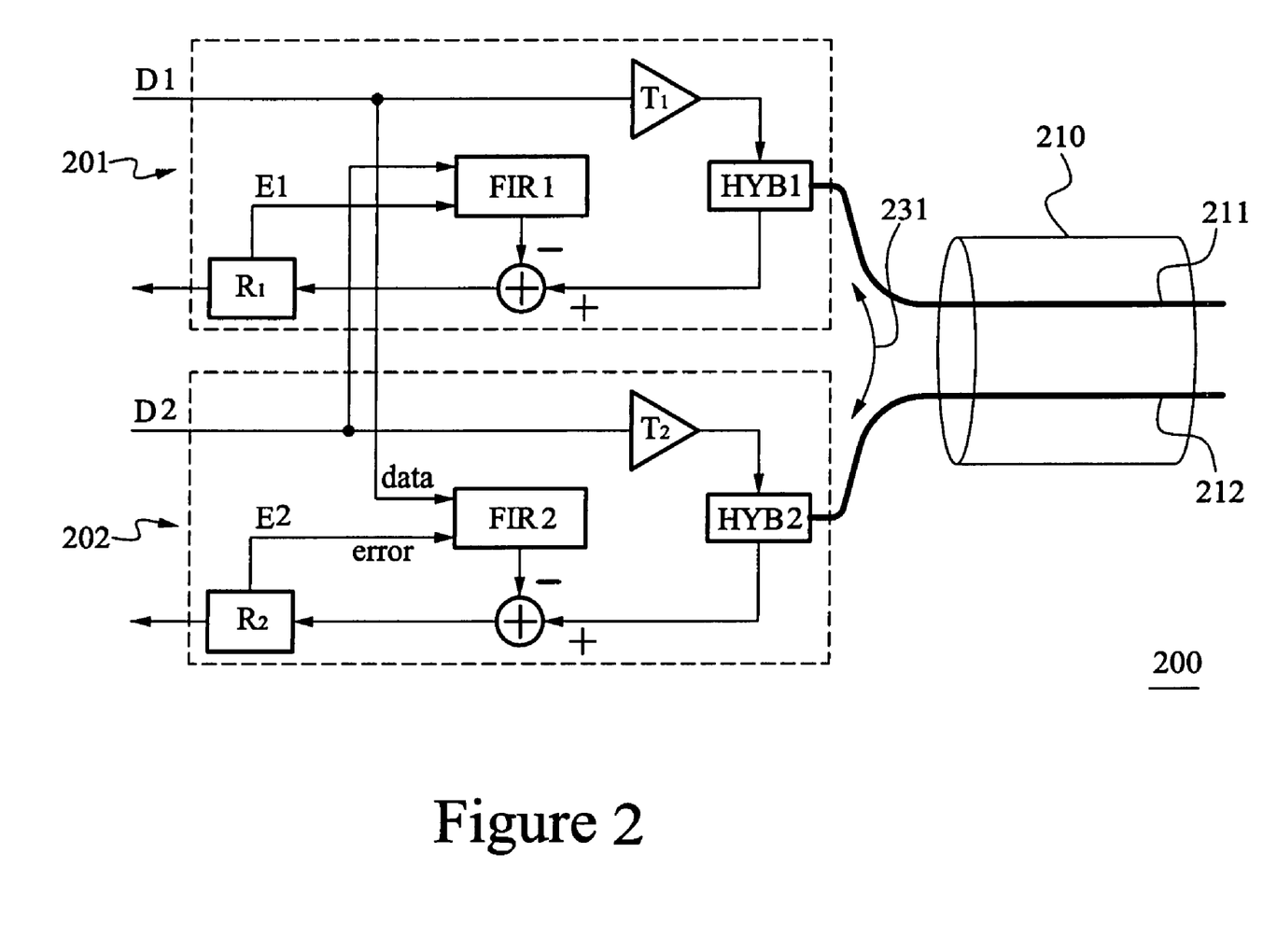
FIG. 2 exemplifies the near-end crosstalk (NEXT) cancellation according to an aspect of the present invention.

FIG. 2 shows an exemplary communication system 200 having a communication channel 210 with bidirectional communication paths 211-212. According to an aspect of the invention, the NEXT 231 between the transceivers 201 and 202 can be cancelled by respectively adding an FIR filter into a receiver and cross-couple the data lines thereof to feed the respective FIR filter with error and data signals.

The error signal is the residual difference between the receiver output and the designated FIR filter is adapted by taking the correlation process between the error signal and the data signal. This process can be done by any algorithm known in the art, e.g., zero-forcing, least mean-square (LMS), or minimum mean-square (MMS). Adaptive signal processing is known in the art and therefore is not further described herein.

Figure 3:
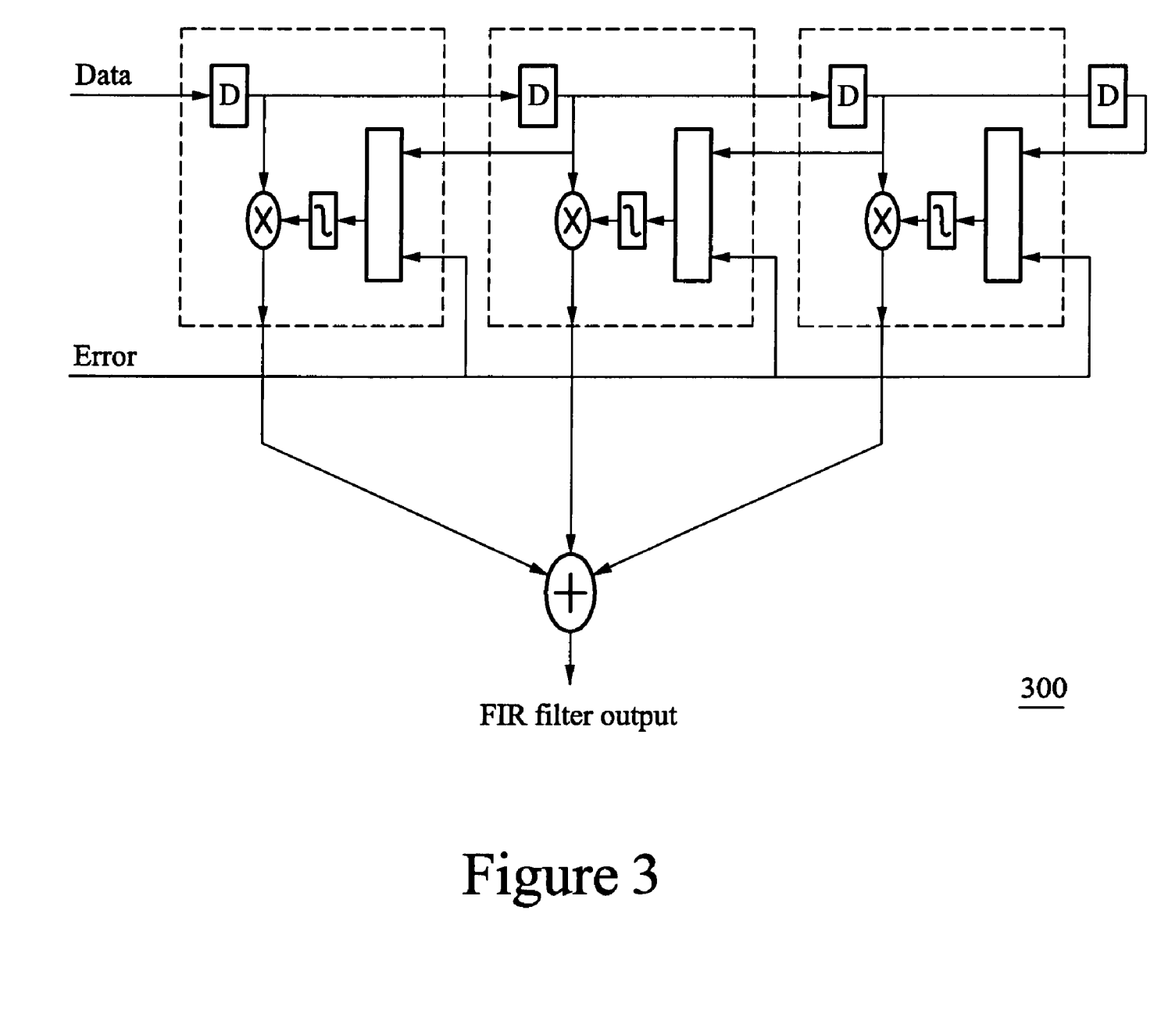
FIG. 3 exemplifies a correlation process of a finite impulse response (FIR) filter.

In this embodiment, FIR1 is coupled to $R_1$ and FIR2 is coupled to $R_2$, respectively. D1-D2 are transmit data sequences. FIR1 receives an error signal E1 generated in the receiver $R_1$ and a data signal D2 transmitted by the disturber, i.e., the transmitter $T_2$ of the transceiver 202. Similarly, FIR2 receives an error signal E2 generated in the receiver $R_2$ and a data signal transmitted D1 by the transmitter $T_1$ of the transceiver 201. The coefficient value of an FIR filter is adapted by taking the correlation process between Error and Data as shown in FIG. 3. Data is multiplied with the Error and the product is integrated with a small coefficient, for example, a value between 0.001~0.000001.

Figure 4:
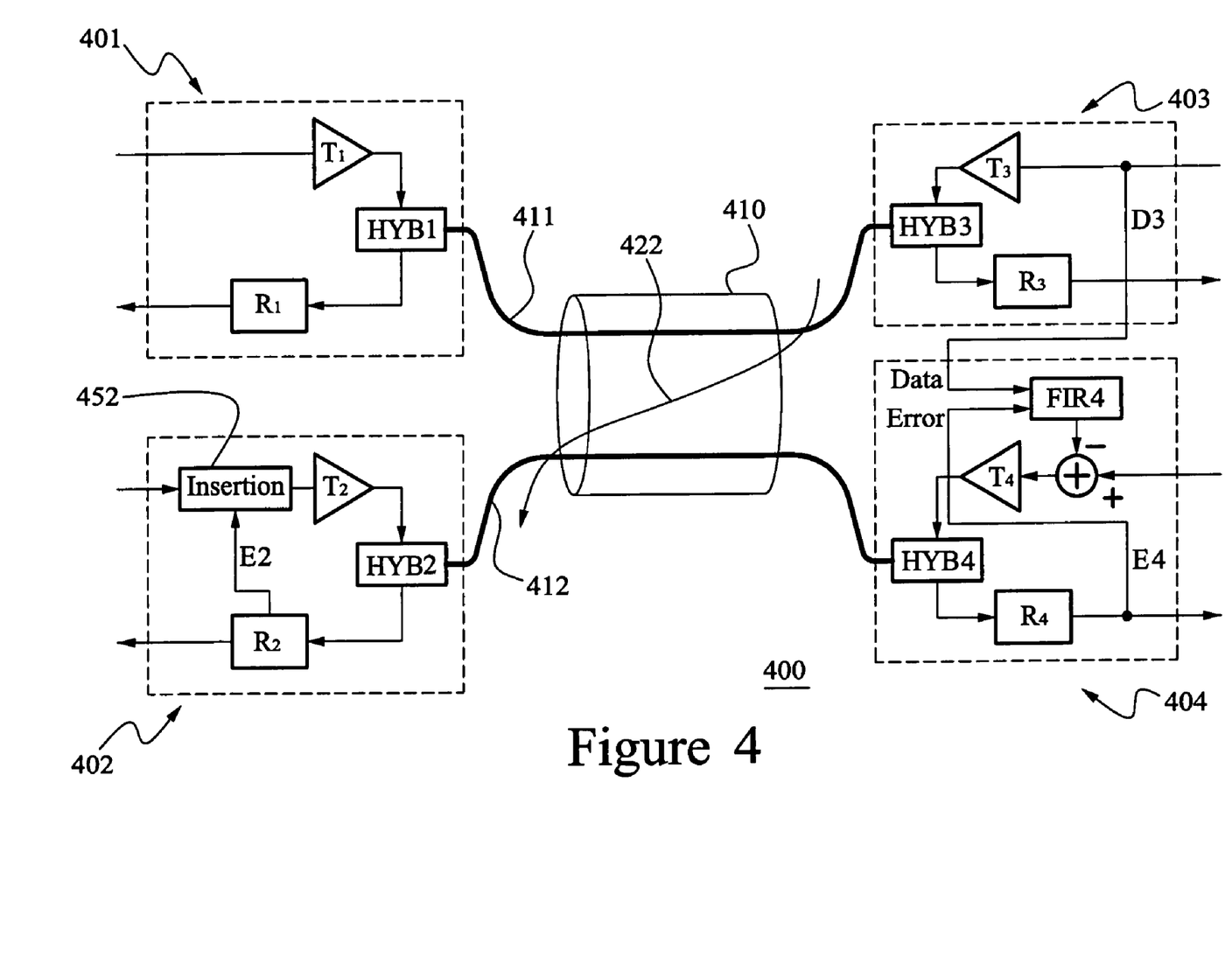
FIG. 4 exemplifies the far-end crosstalk (FEXT) cancellation according to an aspect of the present invention.

FIG. 4 shows an exemplary communication system 400 having a communication channel 410 with bidirectional communication paths 411-412. According to an aspect of the invention, the FEXT 422, which adversely affects the transmission quality of the communication path 412 between the transceivers 402 and 404, can be cancelled by integrating the transceiver 402 with an insertion block or component 452 and integrating the transceiver 404 with an FIR filter FIR4. The insertion block 452 is connected to the receiver $R_2$ of the transceiver 402 for sending an error signal E2 generated therein to the transceiver 404. FIR4 is connected to a local transceiver 403 to receive a data signal D3 being transmitted by the transmitter $T_3$.

To cancel the FEXT 422, the coefficient value of the FIR filter FIR4 needs to be adapted. To do so, the error signal E2 needs to be inserted into the communication path 412 from the transceiver 402 to the transceiver 404. The receiver $R_4$ of the transceiver 404 extracts the error signal E2 in the received stream and sends the extracted error signal E4 to FIR4, which then performs a coefficient adaptation process similar to the one described above with reference to the NEXT cancellation and FIG. 3.

Figure 5:
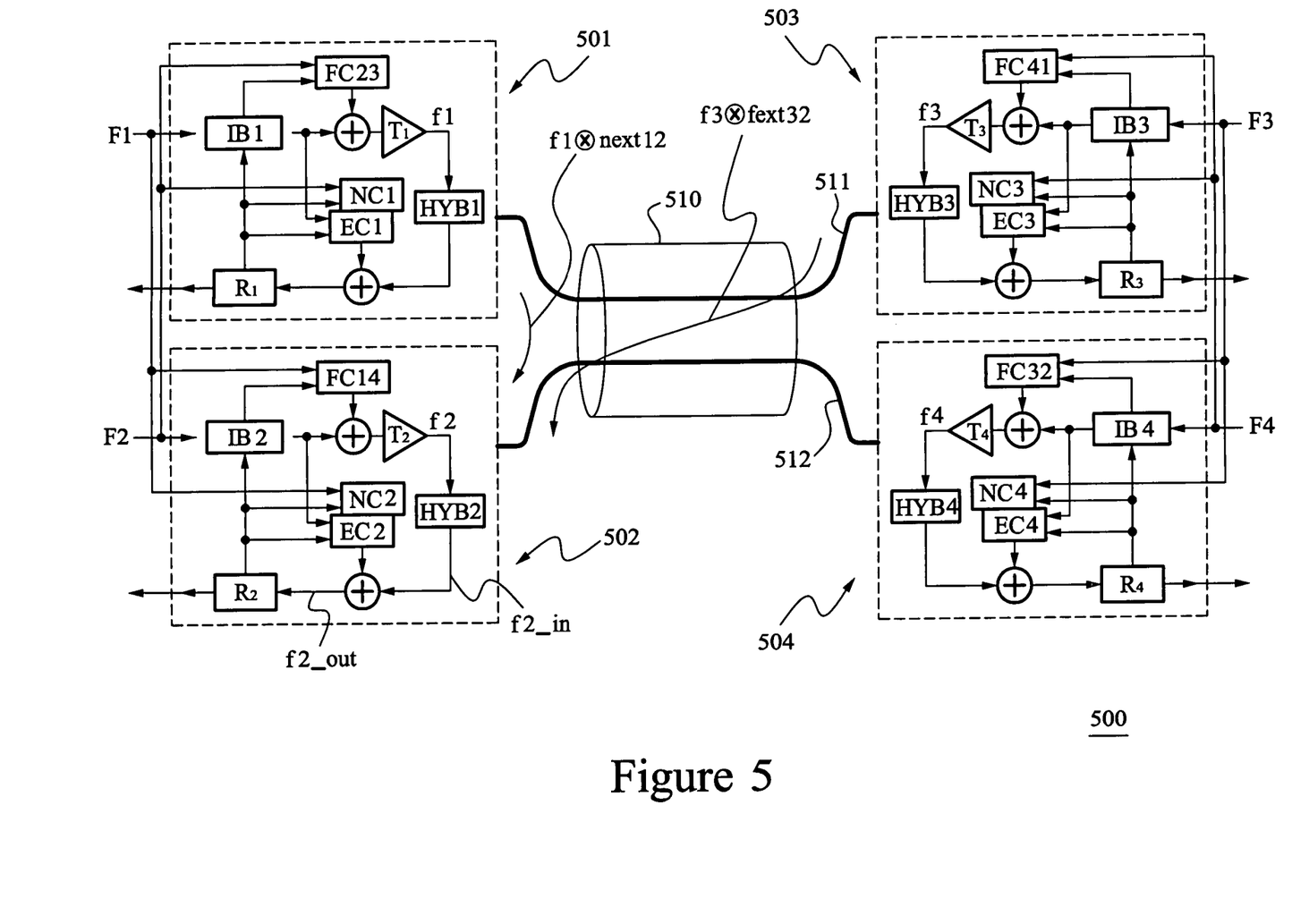
FIG. 5 shows an exemplary two-pair system implementing the present invention.

FIG. 5 is a block diagram of an exemplary system 500 similar to the system configurations exemplified above. The system 500 has two pairs of transceivers 501-504 communicating through two paths 511-512 in a channel 510. The transceivers 501-504 respectively integrate echo cancellers EC1-EC4, NEXT cancellers NC1-NC4, FEXT cancellers FC23, FC14, FC41, FC32, insertion blocks IB1-IB4, as well as receivers $R_1$-$R_4$, transmitters $T_1$-$T_4$ and hybrids HYB1-HYB4. Signal names in capital letters such as F1, F2, F3, and F4 symbolize information (data) from the source. Those of small letters, such as f1, f2, f3, f4, are analog signals after filtered by the FIR filter. Similar to the two-pair structure shown in FIG. 4, each canceller only needs one FIR filter. In embodiments where the system is configured with four pairs of transceivers, the number of FIR filters increases from one to three.

Unlike prior approaches, the crosstalk cancellation in the system 500 is achieved at the respective transmitters $T_1$-$T_4$, rather than the receivers $R_1$-$R_4$. The information obtained at the respective receivers $R_1$-$R_4$, e.g., adaptation data, is sent back to the respective transmitters $T_1$-$T_4$ to facilitate the crosstalk cancellation. Moreover, each NEXT canceller is placed at the "victim" receiver. The NEXT canceller cancels not only NEXT but also echo by adding a corresponding FEXT canceller. Adaptation is done continuously to compensate for changes in crosstalk transfer function or conditions with the surrounding environmental changes, for instance, aging, temperature, humidity, physical pressure, and aging effect of the channel itself. In some embodiments, the adaptation control signal is sent back from a receiver to a transmitter by using an overhead bit in the frame format.

The system 500 provides a unique solution or set of coefficients for the complete cancellation of NEXT and FEXT and echo noises through the hybrid. Both NEXT and FEXT cancellers are implemented with digital signal processing capability for the FIR filter calculation and for converting the FIR filter output to an analog signal. Both NEXT and FEXT cancellers are also implemented with analog circuits. The subtraction is done in the analog signal processing. The output of each analog coefficient value are multiplied with data. Cancellation from all taps weighted by the data are added to the main signal. More specifically, suppose $x \otimes y$ ($\otimes$ is used here to symbolize convolution) is the operation of convolution of x and y responses, then $$f2\_in = f4 \otimes ch42 + f3 \otimes fext32 + f1 \otimes next12 + f2 \otimes hyb2,$$
where ch42 is the channel response from $T_4$ to $R_2$,
fext32 is the FEXT response from $T_3$ to $R_2$,
next12 is the NEXT response from $T_2$ to $R_2$, and
hyb2 is the response of the HYB2.
Further,
f4=F4+F3⊗fc32, fc32 is the response of the FEXT canceller FC32 of the transceiver 504,
f3=F3+F4⊗fc41, fc41 is the response of the FEXT canceller FC41 of the transceiver 503,
f1=F1+F2⊗fc23, fc23 is the response of the FEXT canceller FC23 of the transceiver 501,
f2=F2+F1⊗fc14, fc14 is the response of the FEXT canceller FC14 of the transceiver 502.
Thus, $$\begin{aligned}f2\_in &= (F4+F3\otimes fc32)\otimes ch42 + (F3+F4\otimes fc41)\otimes fext32 + \\ &\quad (F1+F2\otimes fc23)\otimes next12 + (F2+F1\otimes fc14)\otimes hyb2 \\ &= F4\otimes ch42 + F3\otimes fc32\otimes ch42 + F3\otimes fext32 + \\ &\quad F4\otimes fc41\otimes fext32 + F1\otimes next12 + F2\otimes fc23\otimes next12 + \\ &\quad F2\otimes hyb2 + F1\otimes fc14\otimes hyb2 \\ &= F4\otimes (ch42+fc41\otimes fext32) + F3\otimes (fext32+fc32\otimes ch42) + \\ &\quad F1\otimes (next12+fc14\otimes hyb2) + F2\otimes (hyb2+fc23\otimes next12).\end{aligned}$$

After NEXT and echo cancellation, $$\begin{aligned}f2\_out &= f2\_in - nc2\otimes F1 - ec2\otimes F2 \\ &= F4\otimes (ch42+fc41\otimes fext32) + F3\otimes (fext32+fc32\otimes ch42) + \\ &\quad F1\otimes (next12+fc14\otimes hyb2) + F2\otimes (hyb2+fc23\otimes next12) - \\ &\quad nc2\otimes F1 - ec2\otimes F2 \\ &= F4\otimes (ch42+fc41\otimes fext32) + F3\otimes (fext32+fc32\otimes ch42) + \\ &\quad F1\otimes (next12+fc14\otimes hyb2-nc2) + F2\otimes (hyb2+ \\ &\quad fc23\otimes next12-ec2);\end{aligned}$$

where
(ch42+fc41⊗fext32) is the signal component and is processed by the equalization; similarly, $(fext32+fc32\otimes ch42)=0$, if $fc32 = -fext32/ch42$;

$(next12+fc14\otimes hyb2-nc2)=0$, if $nc2 = next12+fc14\otimes hyb2$; and $(hyb2+fc23\otimes next12-ec2)=0$, if $ec2 = hyb2+fc23\otimes next12$.

Accordingly, all NEXT, FEXT, and echo reflection due to hybrid is effectively cancelled.

Figure 6:
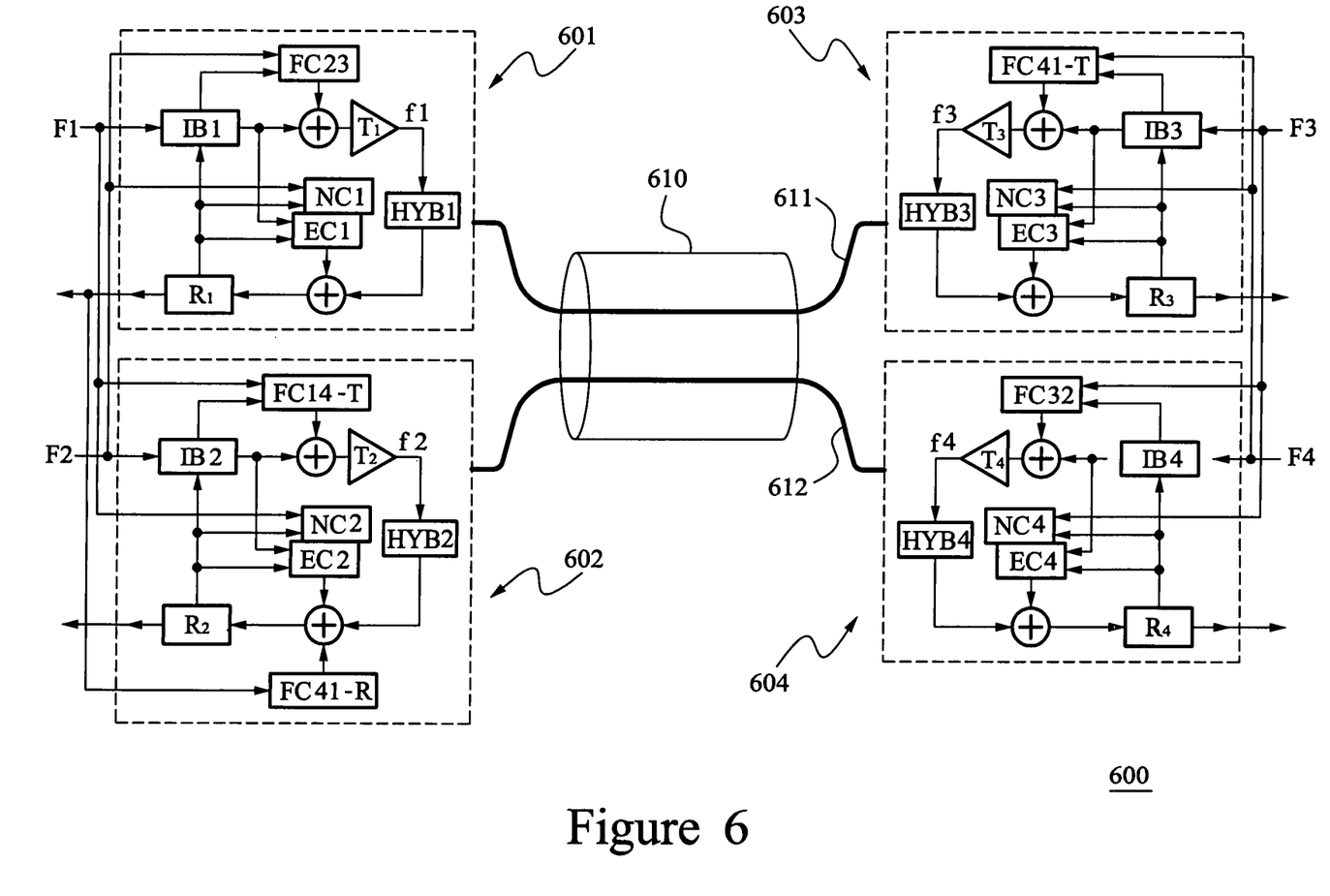
FIG. 6 shows an embodiment similar to FIG. 5 with one of FEXT cancellers built in part at the transmitter and in part at the remote receiver affected by the FEXT.

FIG. 6 shows another exemplary system structure 600 where the FEXT canceller is built in part at the receiver. Similar to the one shown in FIG. 5, the system 600 has two pairs of transceivers 601-604 in which transceiver 601 communicates with transceiver 603 and transceiver 602 communicates with transceiver 604 through their respective communication paths 611-612 in a shared channel 610. The transceivers 601-604 respectively comprise echo cancellers EC1-EC4, NEXT cancellers NC1-NC4, insertion blocks IB1-IB4, as well as receivers $R_1$-$R_4$, transmitters $T_1$-$T_4$ and hybrids HYB1-HYB4.

The transceivers 601-604 further respectively comprise FEXT cancellers FC23, FC14-T, FC41-R, FC41-T, and FC32. In particular, FC41 is built in part as FC41-R at the receiver $R_2$ side of the transceiver 602 and in part as FC41-T at the transmitter $T_3$ side of the transceiver 603.

Figure 7:
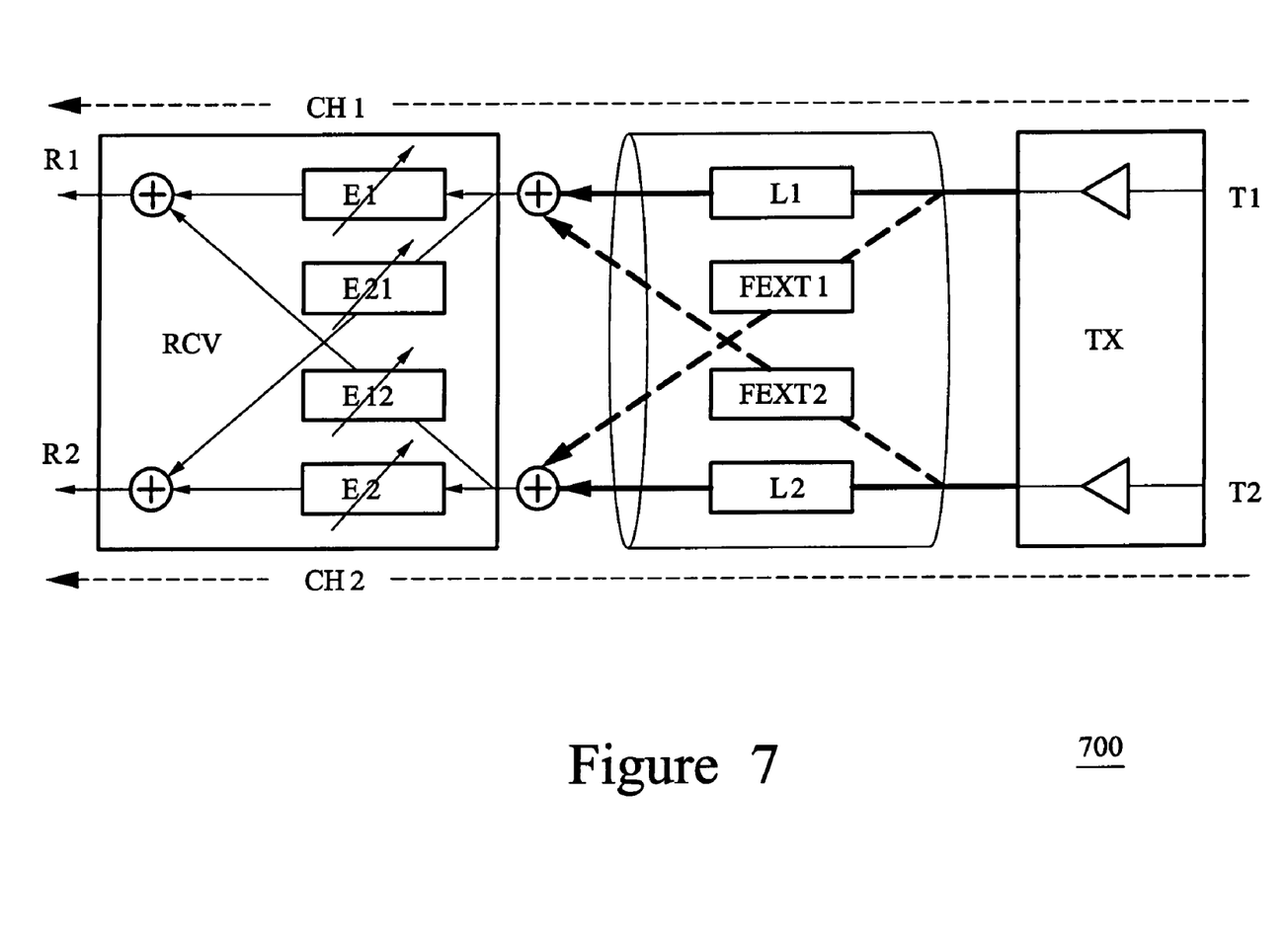
FIG. 7 exemplifies a receiver-based FEXT canceller in an one directional system. In this embodiment, the signal is regenerated at the receiver.

In some embodiments, the FEXT canceller is implemented at the receiver only and the FIR filters in the receiver are adapted so that the SNR of all channels become maximum. FIG. 7 exemplifies a receiver-based FEXT canceller in an one directional system 700. The focus of this embodiment is the regeneration of the signal, rather than the cancellation of the crosstalk noise. Thus, unlike the examples shown before, no back channel is required or necessary. Instead, full multiplication between incoming signal and coefficients are required. To achieve this, four FIR filters E1, E21, E12, and E2 are added at the receiver RCV and adapted so that the SNR of both communication channels CH1 and CH2 becomes maximum. This way, the signal is regenerated at the receiver, crosstalk notwithstanding. One skilled in the art will appreciate that the exemplary receiver-based FEXT canceller also applies to simple and full duplex two-way systems and the likes.

Figure 8:
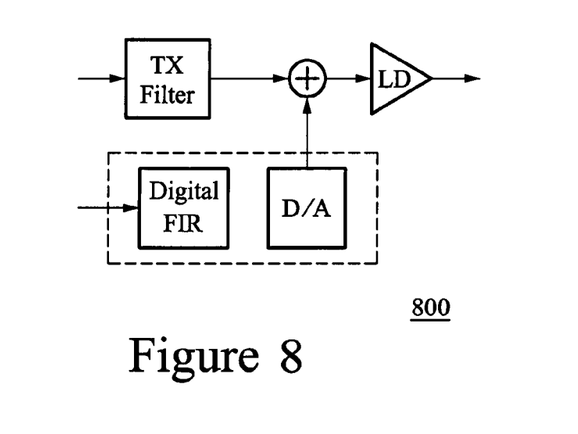
FIGS. 8-10 exemplify various ways to implement the FEXT canceller of FIG. 4.
Figure 9:
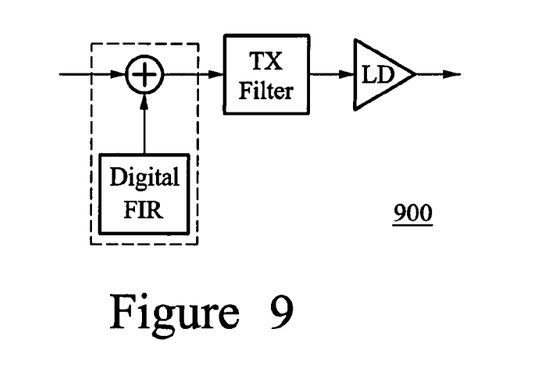
Figure 10:
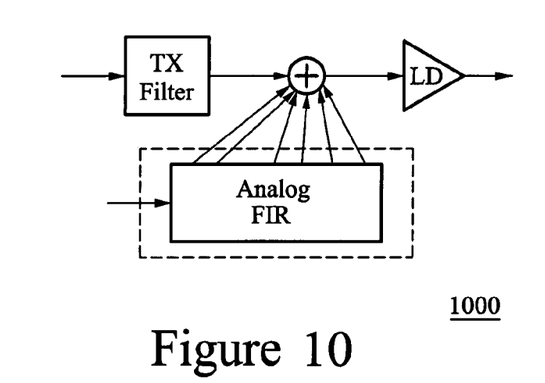

Other implementations of the FEXT canceller are possible. FIGS. 8-10 exemplify various ways to implement the FEXT canceller of FIG. 4. In some embodiments, as exemplified in FIG. 8, the FEXT canceller 800 is implemented digitally, converted to the analog signal, then added to the transmit symbol. In the example of FIG. 9, the FEXT canceller 900 is implemented digitally, added to the transmit symbol in the digital format, and then converted to the analog signal. In some embodiments, as exemplified in FIG. 10, the FEXT canceller 1000 is implemented with any transmit filter operation. As one skilled in the art will appreciate, various factors determine the best implementation for each application/system desired. Such factors may include the requirements and/or targeted goals that a particular system has to achieve, including, but not limited to, performance, speed, convergence speed, cost, power, and so on.

Although the present invention and its advantages have been described in detail, it should be understood that the present invention is not limited to or defined by what is shown or described herein. As one of ordinary skill in the art will appreciate, various changes, substitutions, and alterations could be made or otherwise implemented without departing from the principles of the present invention. Accordingly, the scope of the present invention should be determined by the following claims and their legal equivalents.

We claim:
1. A method for crosstalk cancellation in a system comprising
a transceiver 2 having a transmitter $T_2$ and a receiver $R_2$,
a transceiver 3 having a transmitter $T_3$ and a receiver $R_3$,
a transceiver 4 having a transmitter $T_4$ and a receiver $R_4$, and at least one communication path P1, wherein
said transceiver 2 and said transceiver 4 communicate through said communication path P1, said method comprising, in no particular order,
placing an insertion block between said transmitter $T_2$ and said receiver $R_2$ for inserting an error signal at said receiver $R_2$ into said communication path P1;
placing a far-end crosstalk (FEXT) canceller FC32 at said transmitter $T_4$, said FEXT canceller FC32 comprising a finite impulse response (FIR) filter;

connecting said FIR filter to said receiver $R_4$ for obtaining said error signal;

connecting said FIR filter to said transmitter $T_3$ for obtaining transmit data thereof;

correlating said error signal and said transmit data; and adapting said FEXT canceller FC32 based on said correlating step to compensate far-end crosstalk at said receiver $R_2$.

2. The method according to claim 1, further comprising:
sending an adaptation control signal from said receiver $R_2$ to said transmitter $T_2$.

3. The method according to claim 2, further comprising:
utilizing an overhead bit for said adaptation control signal.

4. The method according to claim 1, wherein said adapting occurs continuously.

5. The method according to claim 1, wherein said adapting is responsive to a change in crosstalk transfer function or environmental condition.

6. The method according to claim 5, wherein said environmental condition is selected from the group consisting of aging, temperature, humidity, physical pressure, and a combination thereof.

7. The method according to claim 1, further comprising:
placing a near-end crosstalk (NEXT) canceller NC2 at said receiver $R_2$.

8. The method according to claim 1, further comprising:
determining a coefficient value of said FIR filter based on said correlating step.

9. An apparatus configured to implement the method of claim 1.

10. A system configured to implement the method of claim 1.

11. A far-end crosstalk canceller, comprising:
a finite impulse response (FIR) filter having
a first input for receiving transmit data from a data line of a first transmitter;
a second input for receiving an error signal sent back from a remote receiver;
an output for producing a coefficient value of a correlation between said transmit data and said error signal;
wherein said far-end crosstalk canceller is placed at a second transmitter and adapted according to said correlation to compensate crosstalk at said remote receiver.

12. The far-end crosstalk canceller according to claim 11, wherein said output of said FIR filter is digitally added to a transmit symbol of said second transmitter and wherein cancellation from all taps weighted by said transmit data is added to a main signal of said second transmitter, further comprising:

a digital-to-analog converter for converting said main signal into a corresponding analog main signal.

13. A communication system having near-end crosstalk, far-end crosstalk, and echo noises essentially effectively cancelled, said communication system comprising:
at least two pairs of transceivers each of which has
a transmitter;
a receiver;
a hybrid connecting said transmitter and said receiver;
an insertion block placed between said transmitter and said receiver;
an echo canceller placed at said receiver;
a near-end crosstalk canceller placed at said receiver;
a far-end crosstalk canceller placed at said transmitter; and
a communication channel linking said at least two pairs of transceivers; wherein
each pair of transceivers communicate through a path in said channel; wherein
said far-end crosstalk canceller is adapted continuously with transmit data from a data line of a neighbor transmitter and adaptation information from a remote receiver.

14. The communication system according to claim 13, wherein part of said far-end crosstalk canceller is built in at a remote receiver.

15. The communication system according to claim 13, wherein said near-end crosstalk canceller cancels near-end crosstalk and echo at said receiver.

16. The communication system according to claim 13, wherein each of said near-end crosstalk canceller and said far-end crosstalk canceller comprises a finite impulse response (FIR) filter.

17. The communication system according to claim 16, wherein said FIR filter comprises:
a first input for receiving said transmit data;
a second input for receiving said adaptation information; and
an output for producing a coefficient value of a correlation between said transmit data and said adaptation information.

18. The communication system according to claim 17, wherein said output of said FIR filter is digitally added to a transmit symbol of said transmitter and wherein cancellation from all taps weighted by said transmit data is added to a main signal of said transmitter, further comprising:
a digital-to-analog converter for converting said main signal into a corresponding analog main signal.

* * * * *

UNITED STATES PATENT AND TRADEMARK OFFICE
CERTIFICATE OF CORRECTION

PATENT NO. : 7,570,685 B2  Page 1 of 1
APPLICATION NO. : 10/959622
DATED : August 4, 2009
INVENTOR(S) : Takatori et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1270 days.

Signed and Sealed this

Seventh Day of September, 2010

David J. Kappos
*Director of the United States Patent and Trademark Office*